(12) United States Patent
Michonski

(10) Patent No.: US 7,848,499 B2
(45) Date of Patent: Dec. 7, 2010

(54) METHOD FOR TRACKING EFFECTIVENESS OF TELEPHONE RESPONSE ADVERTISING

(75) Inventor: David Michonski, Greenwich, CT (US)

(73) Assignee: Michonski Family Enterprises, Inc., Greenwich, CT (US)

( * ) Notice: Subject to any disclaimer, the term of this patent is extended or adjusted under 35 U.S.C. 154(b) by 1394 days.

(21) Appl. No.: 11/227,852

(22) Filed: Sep. 15, 2005

(65) Prior Publication Data
US 2007/0064889 A1 Mar. 22, 2007

(51) Int. Cl.
*H04M 15/00* (2006.01)

(52) U.S. Cl. .............................. 379/114.13; 705/14.41; 705/14.13; 705/10

(58) Field of Classification Search ............ 379/114.13; 705/10, 14.13, 14.41
See application file for complete search history.

(56) References Cited

U.S. PATENT DOCUMENTS

| | | | | |
|---|---|---|---|---|
| 5,903,635 A | * | 5/1999 | Kaplan | .................. 379/112.01 |
| 6,018,571 A | * | 1/2000 | Langlois et al. | ........ 379/201.04 |
| 7,424,442 B2 | * | 9/2008 | Wong et al. | .................... 705/14 |
| 2006/0018441 A1 | * | 1/2006 | Timmins et al. | ......... 379/88.12 |
| 2007/0041527 A1 | * | 2/2007 | Tuchman et al. | ......... 379/88.22 |

* cited by examiner

*Primary Examiner*—Simon Sing
(74) *Attorney, Agent, or Firm*—Anthony H. Handal; Handal & Morofsky, LLC

(57) ABSTRACT

A method of advertising a product, comprising assigning a respective telephone number to a plurality of advertising media elements is disclosed. Telephone numbers are assigned and calls are forwarded to be answered by a sales person or persons. The assignment of the telephone numbers to the sales person or persons is communicated to a computer based telephone services provider. The associated telephone number assignments are imprinted, audibly communicated or otherwise included in their respective advertising media elements. Response information such as the number of calls received by the telephone numbers in response to the advertising is recorded.

13 Claims, 2 Drawing Sheets

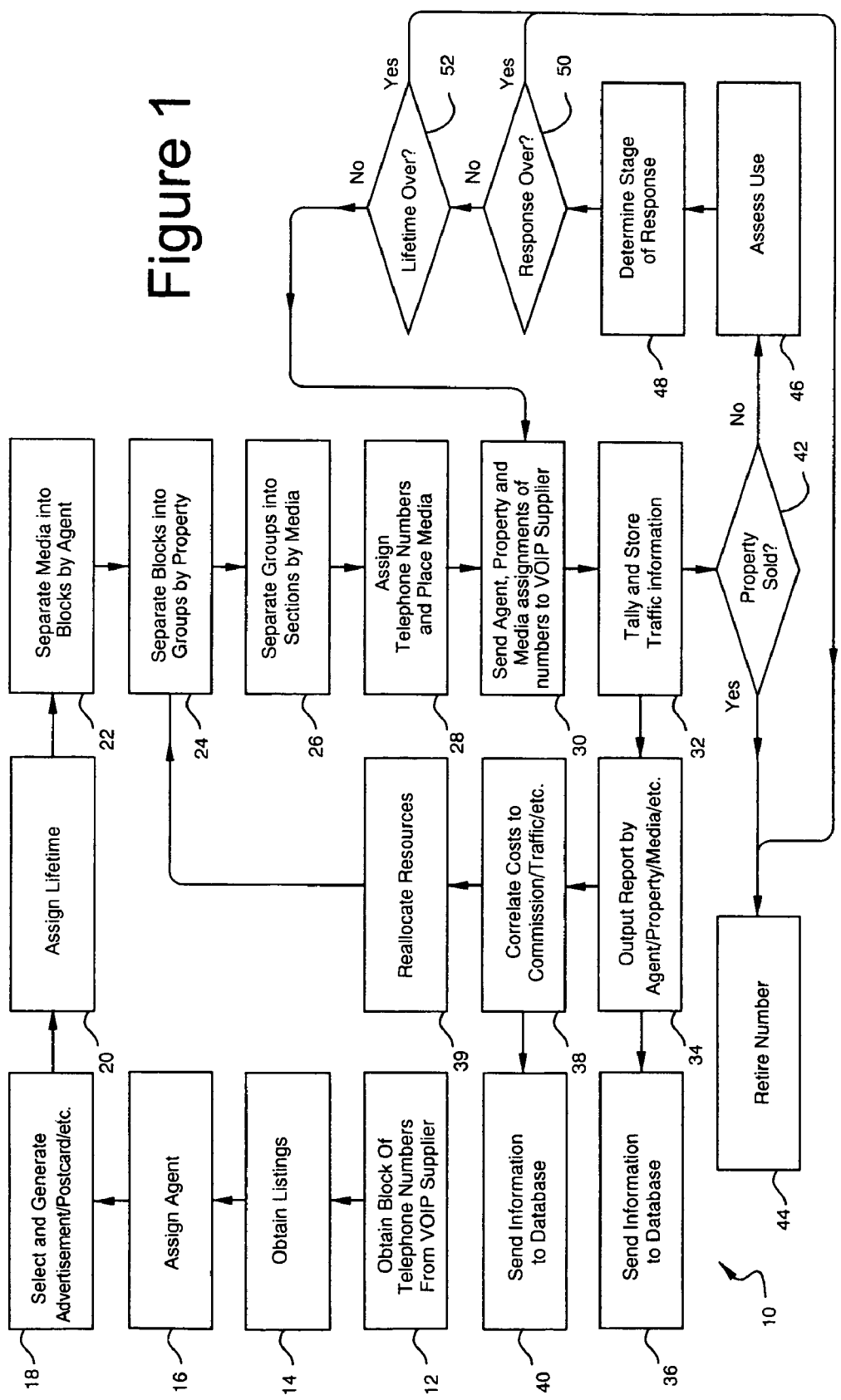

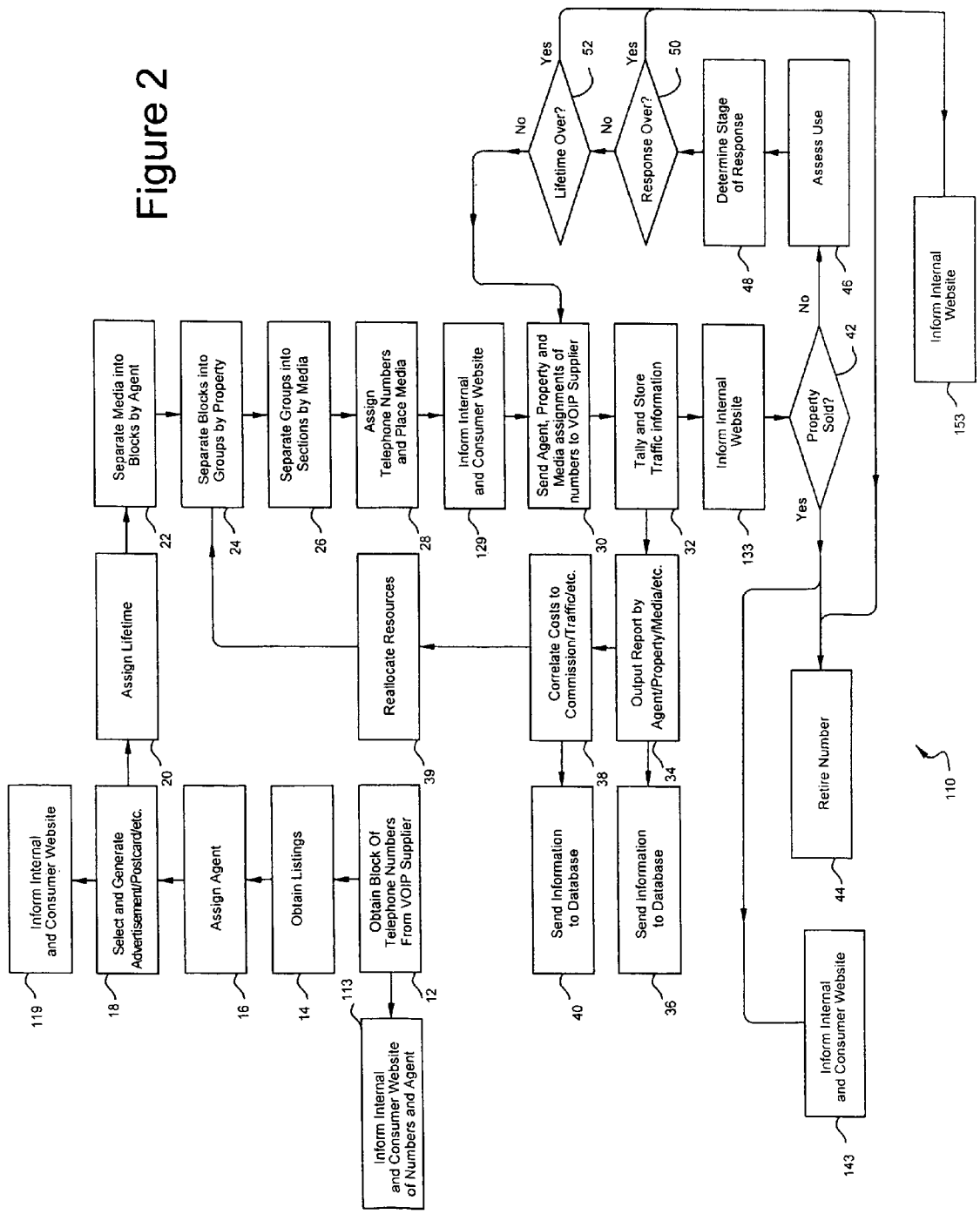

METHOD FOR TRACKING EFFECTIVENESS OF TELEPHONE RESPONSE ADVERTISING

TECHNICAL FIELD

The invention relates to methods for tracking the effectiveness of telephone responses to print, mail, electronic, broadcast and other media advertising and is particularly suited to the operation of a real estate brokerage office.

BACKGROUND OF THE INVENTION

The most common current practice in the marketing of products and services in various business, such as in the real estate industry, contemplates advertising in multiple media and multiple placements of advertisements, for example, of properties for sale. In the real estate business, such advertising is done in association with the telephone number of a particular real estate agent, or a real estate agency. The invention is aimed at providing comparative information with respect to the effectiveness of the media involved.

SUMMARY OF THE INVENTION

In accordance with the invention, information from advertising may be gathered by assigning a unique telephone number to a plurality of advertising media elements. A group of telephone numbers are assigned by the business to a salesperson or a number of salespersons and the assignment of the telephone numbers is communicated to a computer based telephone services provider. The unique telephone number assignments are imprinted or otherwise included in their respective advertising media elements, such as newspaper or television advertisements, postcard mailers, posters, etc. Response information, such as the number of calls received by the telephone numbers in response to the advertising, is recorded. In accordance with a particularly preferred embodiment of the invention, the assigned telephone number is associated with a particular placement of an advertisement in a particular publication or a group of placements. In accordance with the invention, the responses from a particular media element may be measured and compared to the responses from other media elements.

A lifetime may be assigned to each media element and the unique numbers assigned to those media elements, after which the unique telephone numbers may be recycled, optionally after a period of aging. The response may be analyzed to determine whether the response to a particular placement is substantially complete. The recycling of the unique numbers may be done when it is determined that the response is substantially complete.

The response information may comprise calling time and the telephone number of the caller.

The principal details of a property (which is being advertised with the response number) may be caused to appear on a display associated with a telephone receiving calls made in response to the media elements. This may be done by feeding calls to a plurality of particular numbers that may be caused to ring on one telephone instrument, or a group of telephone instruments.

Telephone instruments may be linked to a personal computer on the desk of the real estate agent to enable direct access to more detailed information.

In accordance with a preferred embodiment, the unique telephone numbers are associated with VOIP telephone service because VOIP allows for the economical purchase of a large number of unique telephone numbers which can be re-assigend easily to different persons and media elements, and can economically be forwarded to an individual's permanent telephone number.

Recorded response information is used to generate reports.

BRIEF DESCRIPTION OF THE DRAWINGS

These and other objects of the invention will be understood from the following description taken in conjunction with the figures, in which:

FIG. 1 is a block diagram of the method of the present invention; and

FIG. 2 is a block diagram of an alternative inventive method linking to the website of a real estate operator.

DETAILED DESCRIPTION OF THE PREFERRED EMBODIMENT

Referring to FIG. 1, in accordance with the inventive method for tracking the effectiveness of telephone response advertising 10, a block of telephone numbers is obtained from a voice over Internet protocol VOIP telephone service provider. Because all information, including telephone calling number information (the number of the person placing a call to a real estate agent's telephone, i.e. "caller ID"), telephone called number information (the number called by the caller which may be routed to any instrument), the audio signal comprising the telephone conversation, and so forth are all in digital form, VOIP presents the possibility of routing calls made to any telephone number to any particular instrument. Moreover, such routing may be done in response to an easily accessible interface, for example, a personal computer.

The present invention may be used in a range of contexts, although, for purposes of illustration, the system is described in connection with a real estate brokerage business of the type, for example, which sells residential or commercial real estate.

In accordance with the present invention, it is contemplated that such routing will be done by the VOIP provider, although allowing direct control by the VOIP subscriber through the use of a personal computer and an Internet connection may also be implemented in accordance with an alternative embodiment of the present invention.

Referring back to FIG. 1, once the subscriber has received a block of telephone numbers at step 12 from its VOIP supplier, it is free to use these numbers in connection with any of its marketing activities. Moreover, these numbers may be assigned, at will, to any of the advertisements of various marketers, in the example of the present specification, real estate agents.

The next step in the method of the present invention is, at step 14, to obtain a number of items which are to be sold, for example real estate property listings. Each of the listings is assigned to one or more salespersons, in this case a real estate agent at step 16.

At step 18 various marketing mechanisms are decided upon and generated. For example, this may take the form of postcards which are mailed to prospects. It may also take the form of an advertisement in a newspaper, or an advertisement in a magazine or special publication. Other possibilities include television commercials, radio commercials, Internet banner advertising, posters, and so forth. Each of these advertisements is assigned a unique number to measure its effectiveness. Similarly, specific numbers may also be assigned to advertisements on a particular day or days. Thus the relative effectiveness of various media and placement times may be assessed.

At step 20, a lifetime is assigned to the particular marketing mechanisms. For example, a daily newspaper may be given a lifetime of four days, while a weekly publication may be given a lifetime of two weeks. Moreover, different daily newspapers may be given different lifetimes. By "lifetime" is meant the time after publication during which responses emanating from a particular marketing mechanism are forwarded to the agent and in the process are tracked by the inventive system. Such lifetimes may be determined by observation, trial and error. Moreover, such assigned lifetimes may be shortened in order to accommodate tracking more media and/or placement times with a given block of telephone numbers.

Conceptually, allocation of media to VOIP telephone number assignments may be viewed in different ways. For purposes of illustration, the decided upon media, after assignment of lifetimes to media selected and generated at step 18, may be separated into blocks according to agent at step 22. Each block assigned to an agent (or a plurality of agents responsible for the property) may then be separated into groups by property. For example, an agent may have four properties under his care and may place, or have placed for him, two newspaper ads, one television commercial, and one magazine advertisement for the first property, only one newspaper ad for the second property, only an open house postcard announcement for the third property and three newspaper ads and a special publication for the fourth property.

This totals ten media placements, and in accordance with the present invention, ten telephone numbers would be assigned, one to each of the media placements. At step 24, the blocks may be separated into groups according to property. Finally, the groups may be separated into sections according to media at step 26.

At step 28, a telephone number is assigned to each of the ten media placements detailed above, in the present example. In accordance with the invention, many more media placements, perhaps on the order of 200 or 300 such placements may be involved in the operation of the inventive method in conjunction with a real estate business. In accordance with the invention, each media placement receives a unique telephone number. Thus, in accordance with the present example, two telephone numbers will be assigned to the newspaper ads for the first property, one telephone number for publication in each of the two newspaper ads. Alternatively, a separate telephone number may be assigned to each newspaper advertisement. As yet another alternative, a separate telephone number may be assigned to each property in a single advertisement advertising a plurality of real estate properties. Thus, every time a telephone call is placed to the unique number associated with a particular marketing element (such as a newspaper advertisement),the occurrence of that response, the time at which that response is made and the duration of the call may all be tracked. This information may be tabulated at step 32, thus making it available for analysis.

Likewise, one telephone number may be assigned to the one television commercial for the first property. That telephone number appears in the television commercial so that callers will feed the database with information respecting the response to the television commercial by placing calls to the number associated with and displayed during the television commercial. In this way the time of day of heaviest calling, the area code(s) from which calls originate, and the media used, can all be assessed and compared to other times of day, other area codes and other media used.

In similar fashion, one telephone number may be assigned to the one magazine advertisement for the first property. Continuing with the example, one telephone number may be assigned to the one newspaper ad for the second property and another unique telephone number assigned to the open house postcard announcement for the third property. In accordance with the invention, still yet another unique telephone number may be assigned to each of the three newspaper ads for the fourth property. Finally, one telephone number may be assigned to the special publication for the fourth property.

In accordance with the invention, it is noted that information respecting agent, property, publication, media, etc. may be furnished to the VOIP provider so that the VOIP provider can provide marketing information, and perhaps analysis to its subscribers as a service. Alternatively, the VOIP provider may only be provided with telephone number assignments to particular instruments of various agents, or telephone instruments in various locations, so that the VOIP provider can route each call to the appropriate telephone instrument. In this case, the subscriber may maintain a database recording the number of hits, the time of the hits and the duration of the hits made to various telephone numbers, which information can be downloaded, for example, daily, by the subscriber from a tally database maintained by the VOIP service provider.

Alternatively, if the switching to various telephones is done by the real estate operator, the database may be populated by on premises computing equipment.

Information respecting the assignment of telephone numbers to properties, media, the agents who are to receive the telephone calls from each of the telephone numbers, and perhaps other information (such as media cost) may be sent to the VOIP provider in accordance with the present invention.

The provision of the names of the agents who are to receive the telephone calls that are placed by potential buyers to each of the telephone numbers may be of particular importance in order to provide for calls being received by the agent managing the property.

It is thus seen that, in accordance with the present invention, a unique telephone number may advantageously be associated with each media placement. As calls are placed, the identity of the called number, and the number of calls to that number, as well as the time and frequency with which these calls are placed provide valuable information with respect to the effectiveness of the media to which the telephone numbers are assigned. At the same time, because VOIP telephone service is used, telephone number assignments are dynamic, and may be continuously reassigned to track changes in media placements, lifetime of media placements, assigned agents to particular properties, and even division of agent responsibilities on individual properties between, for example, live functions such as open houses, television advertising, Internet advertising, and so forth.

As alluded to above, at step 32, the system tallies the number of telephone responses made to the telephone numbers in the block, the time during which the calls are made and the duration of the calls. In principle, additional information, such as the sex of the caller, or the like which may be electronically gathered from the audio signal may also be inputted into the database.

This information may then be outputted in the form of a report at step 34, providing information correlated between agent, property, media, cost, time of day, duration of calls, and so forth as may be specified by a user. Such information may also be sent to a database at step 36 for future reporting and/or evaluation at step 36.

More sophisticated analysis may be done at step 38, where degrees of correlation as a function of cost and other factors may be evaluated and compared using a computer programmed to test the data to discover patterns for future guidance of the persons responsible for marketing. Such information may be sent to a database at step 40 or output as a printed report.

After the reports and pattern discovery have been reviewed by a human operator, the system receives a human input reallocating resources at step 39, for example, reallocation of resources based on the relative effectiveness of various media elements. Such reallocation of resources may mean adding or subtracting media, changing the schedule of advertising of, for example, television advertising, changing the nature of the advertising, changing the content of website advertisement, and so forth. The system then returns to step 24 where changes in such reallocation of resources is processed in accordance with the method as detailed above.

At regular periodic intervals, for example once each day, the system checks at step 42 to see whether the property has been sold or rented or for any reason does not need to have its reponses tracked any longer. Such information may be determined by reference to the internal portion of the website of the real estate brokerage company, for example a website such as that disclosed in U.S. patent application Ser. No. 11/027,530 of Michonski filed on Dec. 30, 2004, the disclosure of which is hereby incorporated herein by reference.

If the property has been sold, the system proceeds to step 44 where the telephone number is retired into a pool of available numbers where it may be used again in connection with another real property listing, advertisement or agent. In accordance with the preferred embodiment of the invention, it is contemplated that such telephone numbers will not be immediately reused, but will be aged for a period of time, for example one or two weeks, or perhaps longer as experience may dictate in connection with the particular type of property or the particular media involved or type of media involved.

During the aging period, in accordance with the preferred embodiment of the invention, the particular VOIP telephone number which is being aged will continue to be routed to the telephone of the agent responsible for the listed property with which it was associated, but that number will not appear in advertisements. This allows the agent to achieve some measure of benefit from the advertising, even after the property has been sold, or the number retired for other reasons. After the aging period, the number may be reused in connection with another marketing activity.

In accordance with the invention, the principal details on a property with which the number is being advertised may be caused to appear on the display of the telephone or on an associated device such as a personal computer. Telephones with such alphanumeric displays are in common use today, often controlled by mainframe computer systems associated with the offices in which they operate, and may be programmed to provide all manner of information, such as listing number, address, apartment size, apartment number, price, days listed, and so forth. Moreover, such telephones may be linked to a personal computer on the desk of the real estate operator to enable direct access to pictures and more detailed information, together with the ability to e-mail such information to a caller.

Still another possibility is for a message from a caller to be forwarded to a personal communication device, such as those capable of receiving e-mail, such as those sold under the trademark Blackberry. This allows reduced response times and better service, as well as a better likelihood of success in the sales effort.

If on the other hand, the property has not been sold, after the periodic check implemented at step 42, the traffic generated by each particular advertisement may be analyzed to determine its position in the typical response cycle. Such response cycle generally includes a rising frequency of calls in the initial phase of the response, followed by decreasing response rates, and falling off to zero over time. The timeframe for such response will vary from one publication, television station, and so forth to another, but by analyzing the same, using information about the particular media, it is possible to determine whether the response has substantially declined to zero.

Such analysis is done at step 46 and a determination is made at step 48 respecting the stage of development or decline which the response to the advertisement has generated. If it is determined that the response is substantially complete, at step 50 the system proceeds to step 44, where the number is retired.

If, on the other hand, the response to the advertisement is not substantially finished, the system goes to step 52, where a determination is made whether the lifetime is over. If the lifetime is not over, the system returns to step 32, where it continues to tally results.

If the lifetime is over, the system retires a number at step 44, where calls continue to be received by the assigned agent, during an aging period, after which the number may be reassigned.

It is noted that the report generation is likely to occur once a week at step 34, thus allowing human intervention, whereas a response time determination made at step 46-50 may be done, for example, daily to provide a computerized monitoring of the system, with possible outputs to supervisors upon the determination of a substantial termination of advertisement response.

If it is determined at step 50 that the response is not over, the system proceeds to step 52 where the system determines whether the lifetime assigned at step 20 is too short or too long. If the lifetime assigned at step 20 is determined to be too short or too long, human intervention can change the lifetime and then, the system retires the telephone number at step 44.

Referring to FIG. 2, an alternative embodiment of the method of the invention is illustrated. Method 110 is substantially identical to method 10, except additional steps are included which link this method to the operation of an internal and external website of the type described in the above identified (and by reference incorporated patent application).

More particularly, in method 110 after a block of telephone numbers have been obtained from the VOIP supplier, this information is sent to the internal website which supplements and drives the internal operation of the real estate agency and also to a publicly available consumer website which performs the normal marketing functions of a website on the Internet. After advertisements have been selected at step 18, they are, where appropriate, exported to the consumer website at step 119.

In similar fashion, after telephone numbers have been assigned and media placed at step 28, this information is sent to the internal and consumer website at step 129.

Other types of information need only be sent to the internal website. For example, after traffic information has been tallied and stored at step 32, this information is sent to the internal website at step 133.

After a property has been sold as determined at step 42, this information is sent to the internal and consumer website at step 143.

Finally, the internal website is informed at step 153 after it has been determined at step 50 that the response period has effectively terminated or, at step 52, that the lifetime has expired.

In accordance with the invention the public has access to the public website but does not have access to the internal website. Moreover, there may be levels of authority necessary to access different levels of information in the internal website.

While illustrative embodiments of the invention have been described, various modifications will become apparent to those of ordinary skill in the art on the reading of the instant specification. For example, the order of steps may be changed, and steps may be added to or taken away from the disclosed method without departing from the spirit and scope of the invention which is limited and defined only defined by the appended claims.

The invention claimed is:

1. A method of advertising a plurality of similar products, using a computer system linked to a telephone system comprising:
   (a) assigning to each of a plurality of advertising media elements, said media elements advertising a first product or service, a respective associated telephone number;
   (b) assigning the answering of said telephone numbers to a sales person or persons, or an automated answering system;
   (c) communicating, to a computer based telephone services providing system, said assignment of said telephone numbers to said sales person or persons;
   (d) imprinting, audibly mentioning or otherwise communicating each respective associated telephone number in the respective advertising media element to which it is assigned;
   (e) placing said advertising media elements;
   (f) recording in a computer database, as response information, information relating to calls placed, in response to each of said advertising media elements, to said telephone numbers;
   (g) assigning a lifetime to each media elements;
   (h) recycling, and storing said lifetime using a computer database, said associated numbers at the end of said assigned lifetime;
   (i) repeating steps (a) through (e), inclusive, for a similar second product or
   (j) using a computer to analyze and correlate said response information for said first product or service, and said second product or service to determine effectiveness of said advertising media elements; and
   (h) using a computer to correlate the results of said analyzing to determine the effectiveness of said advertising media elements.

2. A method of advertising as in claim 1, wherein said response information comprises calling time and the telephone number of the caller.

3. A method of advertising as in claim 1, wherein calls to said telephone number are routed to a desired instrument or instruments, said instruments having a display panel, said display displaying principal information associated with said called number relating to a property associated with the media elements assigned to said telephone number.

4. A method as in claim 3, wherein said principal information comprises listing number, address, apartment size, apartment number and price.

5. A method as in claim 4 wherein said instruments are linked to a personal computer on the desk of the real estate agent to enable direct access to more detailed information.

6. A method of advertising as in claim 3, the associated telephone number is reassigned to a media element associated with a similar product.

7. A method as in claim 3, wherein information developed during the operation of the method is exported to a publicly accessible website and/or an internal operational website accessible only by persons responsible for internal operations of an enterprise using the claimed advertising method.

8. A method as in claim 3, wherein said response information for a plurality of media elements is assessed or compared.

9. A method as in claim 8, wherein the placing of advertising media elements is varied in response to said assessment or comparison.

10. A method of advertising as in claim 1, wherein said unique telephone numbers are associated with VOIP telephone service.

11. A method of advertising as in claim 1, wherein said recorded response information is used to generate reports.

12. A method of advertising as in claim 1, wherein said product or service is a real estate property, and wherein said recycling of said telephone numbers is done after an aging period of time.

13. A method of advertising as in claim 1, wherein one of said media elements is a single advertisement in a single newspaper.

* * * * *